United States Patent [19]

Kazantzis et al.

[11] 3,863,061

[45] Jan. 28, 1975

[54] ALU WITH END-AROUND CARRY DERIVED FROM AUXILIARY UNIT

[75] Inventors: George B. Kazantzis, Endicott; Richard E. Nier, Apalachin, both of N.Y.

[73] Assignee: The United States of America as represented by the Secretary of the Navy, Washington, D.C.

[22] Filed: Aug. 16, 1973

[21] Appl. No.: 389,067

[52] U.S. Cl. .............................................. 235/175
[51] Int. Cl. .............................................. G06f 7/50
[58] Field of Search .............................................. 235/175

[56] References Cited

UNITED STATES PATENTS 3,267,269 8/1966 Cichanowicz et al.............. 235/175

OTHER PUBLICATIONS

I. Flores, The Logic of Computer Arithmetic, Prentice-Hall, Inc., 1963, pp. 29–32.

R. K. Richards, Arithmetic Operations in Digital Computers, D. Van Nostrand Co., Inc., 1955, pp. 119–121.

Synthesis of Electronic Computing & Control Circuits, Harvard Press, 1951, pp. 159–161.

*Primary Examiner*—Felix D. Gruber
*Assistant Examiner*—David H. Malzahn
*Attorney, Agent, or Firm*—R. S. Sciascia; L. I. Shrago

[57] ABSTRACT

An arithmetic logic unit which requires an end-around carry in its operation obtains this carry from an auxiliary arithmetic logic unit which is connected in parallel with it. Since the end-around carry does not appear in a closed loop, oscillations which might otherwise occur in the solution because of the irregular appearance of input data are minimized.

2 Claims, 3 Drawing Figures

ALU WITH END-AROUND CARRY DERIVED FROM AUXILIARY UNIT

The present invention relates generally to computing and data processing systems and, more particularly, to such systems which utilize 1's complement arithmetic in a mathematical processing operation.

In performing 1's complement arithmetic, an end-around carry is required, and this mode of operation is usually achieved by feeding back the arithmetic unit's carry-out to its carry-in.

However, under certain conditions, when, for example, the addition or subtraction solution is an all 'one's' condition and the gating of the input data is not simultaneous, a ripple may be generated because of the interconnection of the carry-in and carry-out lines. Since this ripple appears in a closed loop, it may persist and be self-sustaining. Such a disruption within the arithmetic logic unit will, of course, result in the appearance of an incorrect solution.

In order to avoid this possible error, the ALU may be designed such that the carry-out into the carry-in is delayed until the various individual inputs have been stabilized. Thereafter, the carry-out may be gated into the carry-in location. This technique, however, extends the time required for each cycle of operation of the processor and reduces the speed of the overall system.

It is, accordingly, a primary object of the present invention to provide a data processing system using 1's complement arithmetic which minimizes oscillations in the ALU due to end-around carry.

Another object of the present invention is to provide a 1's complement ALU wherein the end-around carry does not operate in a closed loop.

Another object of the present invention is to provide a main ALU wherein the carry-in originates at an auxiliary unit and, thus, eliminates the necessity of an interconnection between its carry-out and carry-in.

Figure 1:
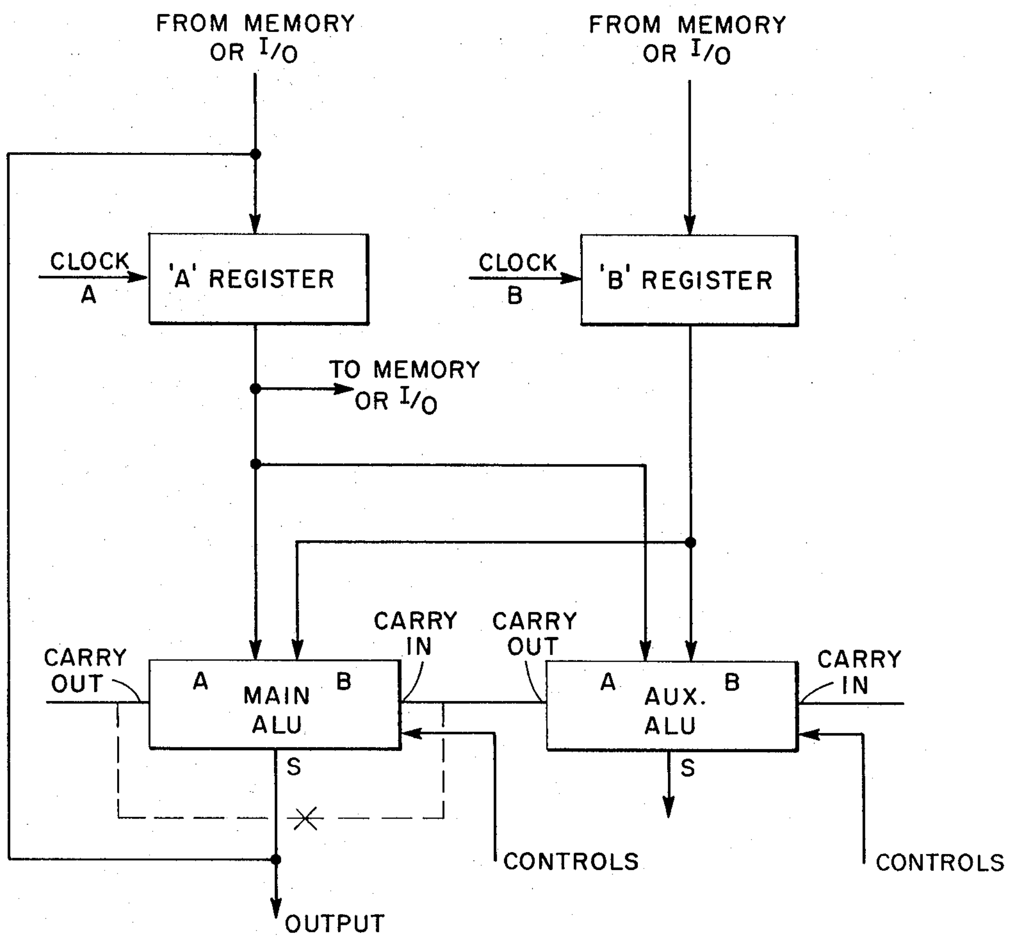
Figures 2, 3:
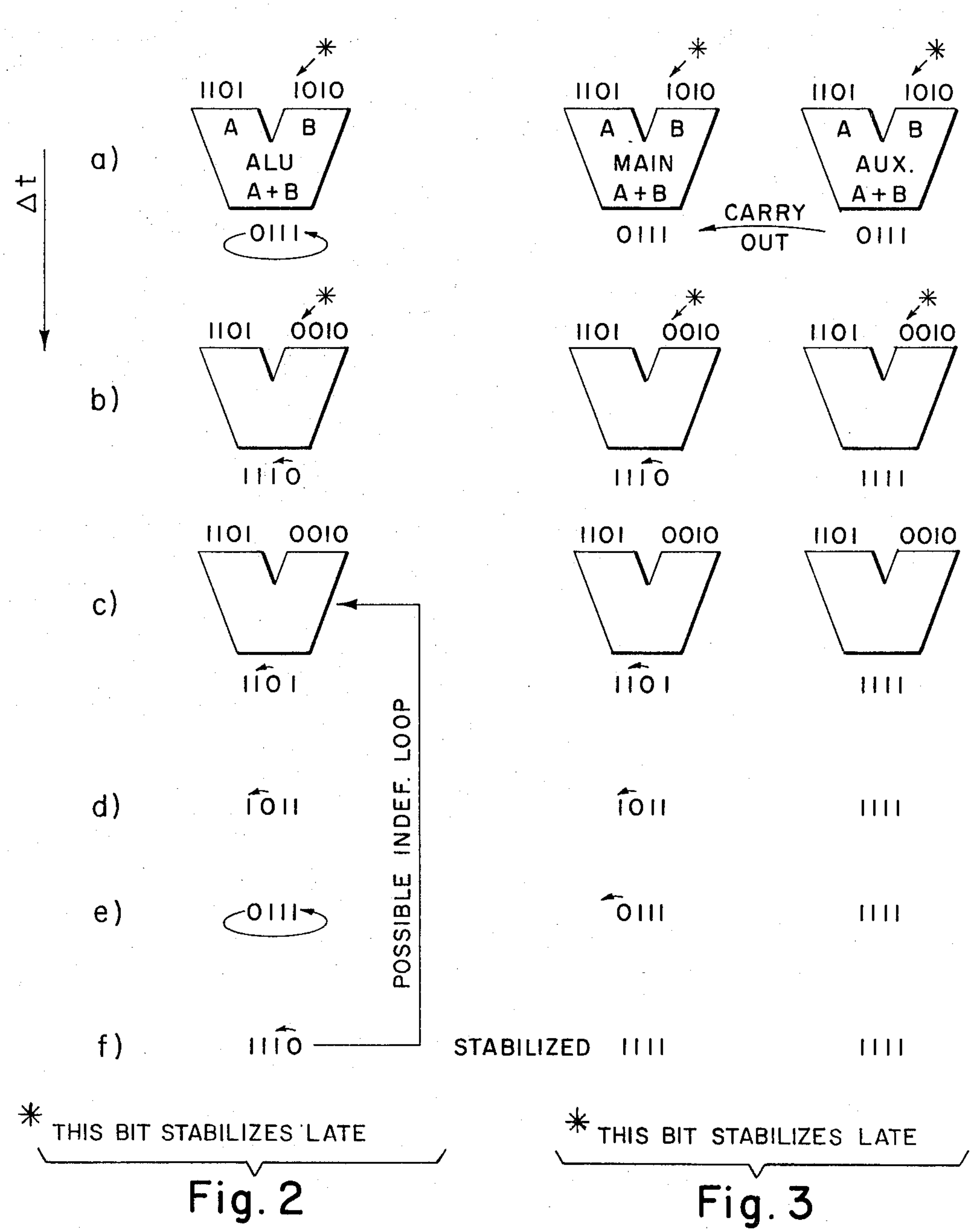

Other objects, advantages and novel features of the invention will become apparent from the following detailed description of the invention when considered in conjunction with the accompanying drawings:

FIG. 1 illustrates a simplified processor having a 1's complement ALU utilizing the present invention;

FIG. 2 schematically illustrates how oscillations may occur within an arithmetic unit having an end-around carry due to input instability; and FIG. 3 is a similar illustration showing how the above oscillations may be curtailed.

Referring now to FIG. 1 of the drawings which shows a simplified processor, it will be seen that this portion of a data processing system, for example, may include an 'A' and 'B' register associated with a main ALU that may be either adding or subtracting the quantities stored in these registers depending upon the nature of the control instruction. For purpose of this description, the contents of the 'A' and 'B' registers are to be added and the answer loaded into the 'A' register at the occurrence of a clock pulse from clock A.

It will be appreciated, of course, that the input data to both registers may originate from different memories or input/output devices, and because of this and other reasons, elements of data may appear at slightly different times and under circumstances which will result in the transfer of the answer back into the 'A' register before this data has been fully stabilized. The maximum speed of the processor, thus, depends upon how quickly the data stabilizes at the output of the main ALU. Stated somewhat differently, the input to the 'A' register must be stabilized prior to the occurrence of a loading clock pulse A.

Since the processor clocks it registers at regular short intervals, it is, therefore, highly important that the ALU outputs do not have sustained or persistent oscillations. Such oscillations may occur when the solution of the mathematical operation is an all 1's condition and the ALU is utilizing an end-around carry. This situation is, perhaps, best illustrated by FIG. 2 which schematically illustrates an addition carried out by 1's complement arithmetic where an end-around carry is necessary for a correct answer. In this example, the content of register 'A' is 1101 and that of 'B', 0010. However, it will be assumed that at the time shown in line a, the input data to register 'B' is unstable and that the most significant bit thereof, identified with the *, appears as a 1 instead of 0. Thus, during this period of instability, the total first appears as 0111 with an end-around carry improperly present. If the above bit now stabilizes to a 0, the total changes to 1110 with an inappropriate 0 present in the least significant bit. This 0 may propagate from its present location to the most significant bit and back around again either indefinitely or sufficiently long to cause erroneous data to be clocked into the 'A' register. The manner in which this oscillation or ripple circulates is shown in lines *c*, *d*, *e* and *f*.

This circulation, of course, is due to the closed loop brought about by the interconnection of the carry-out to the carry-in in an ALU operating with an end-around carry. This interconnection, which is omitted in the present invention, is represented by the dotted line in FIG. 1.

To avoid the above problem, the processor of the present invention uses an auxiliary ALU similar in construction to the main ALU. This auxiliary unit is effectively connected in parallel to the main unit so that the content of 'A' and 'B' registers are also being added therein concurrently with their addition in the main unit. However, neither the main nor the auxiliary ALU has the usual interconnection between its carry-out and carry-in. Rather the carry-in for the main unit is derived from the carry-out of the auxiliary unit. By resorting to an auxiliary ALU for the appropriate carry-in, any oscillation created within the main ALU can only persist for a time required for this oscillation to travel from the least significant to the most significant bit. When it reaches this bit, it must stop since it has no return path back to the last significant bit.

FIG. 3 illustrates the manner in which the auxiliary ALU provides the carry-in and, in doing so, prevents the circulation of a 0 bit continuously through the main ALU. It will be seen from an examination of this FIG. that when the most significant bit in the 'B' register is unstable and has a 1 status instead of its true 0 status both ALUs will show a total of 0111 with a carry-in being supplied to the main ALU. When this bit stabilizes, as shown in line b, the auxiliary ALU will show a total of 1111 and the main ALU a total 1110, with the 0 being an erroneous bit. This bit, as shown in successive lines *c*, *d* and *e* can only travel to the most significant bit location. Thereafter, with the input data to the arithmetic units still stabilized, the main ALU will show a correct total, namely, 1111, the sum of 1101 and 0010.

It would be pointed out that the auxiliary ALU shows a correct answer only for this case, and it will be recognized that the auxiliary answers are correct only if there is no carry-out. Consequently, the results are only taken from the main ALU.

What is claimed is:

1. In a computer, the combination of a main arithmetic logic unit which performs addition and subtraction by a complementary process, said arithmetic logic unit having a pair of input lines, a carry-out location at which the end-around carry signal appears a carry-in location at which the end-around carry signal is applied, said carry-out and carry-in locations being disconnected;

an auxiliary arithmetic logic unit which also performs addition and subtraction by a complementary process, said auxiliary arithmetic logic unit having a pair of input lines, a carry-out location at which the end-around carry signal appears and a carry-in location at which the end-around carry signal is applied, said last mentioned carry-out and carry-in locations also being disconnected;

means for connecting the input lines of said main and auxiliary arithmetic logic units in parallel; and means for connecting the carry-out location of said auxiliary arithmetic logic unit to the carry-in location of said main arithmetic logic unit whereby the end-around carry signal produced by said auxiliary arithmetic logic unit is utilized in the operation of said main arithmetic logic unit.

2. In a computer, the combination of a main arithmetic logic unit which performs addition and substraction by a complementary process, said arithmetic logic unit having a pair of input lines, a carry-out terminal at which the end-around carry signal appears and a carry-in terminal to which the end-around carry signal is applied, said arithmetic logic unit being constructed such that its carry-out and carry-in terminals are not interconnected;

an auxiliary arithmetic logic unit which performs addition and subtraction by a complementary process, said auxiliary arithmetic logic unit having a pair of input lines, a carry-out terminal at which the end-around carry signal appears and a carry-in terminal to which the end-around carry signal is applied, said auxiliary arithmetic logic unit being constructed such that its carry-out and carry-in terminals are not interconnected;

means for connecting the input lines of said main and auxiliary arithmetic logic units in parallel so that both units concurrently process the same numerical quantities; and means for interconnecting the carry-out terminal of said auxiliary arithmetic logic unit to the carry-in terminal of said main arithmetic logic unit whereby the end-around carry signal utilized in said main arithmetic logic unit is obtained from the auxiliary arithmetic logic unit.

* * * * *